United States Patent [19]

Boys et al.

[11] Patent Number: 5,619,078
[45] Date of Patent: Apr. 8, 1997

[54] PRIMARY INDUCTIVE PATHWAY

[76] Inventors: John T. Boys, 15A Island Bay Road, Birkdale, Auckland 10, New Zealand; Shuzo Nishino, 2-11, 3-Chome, Mitejima, Nishlyodogawa-Ku, Osaka 555, Japan

[21] Appl. No.: 335,710

[22] PCT Filed: May 5, 1993

[86] PCT No.: PCT/NZ93/00032

§ 371 Date: Nov. 10, 1994

§ 102(e) Date: Nov. 10, 1994

[87] PCT Pub. No.: WO93/23909

PCT Pub. Date: Nov. 25, 1993

[30] Foreign Application Priority Data

| May 10, 1992 | [NZ] | New Zealand | 241380 |
| Jun. 10, 1992 | [NZ] | New Zealand | 243102 |
| Feb. 22, 1993 | [NZ] | New Zealand | 245956 |
| Feb. 22, 1993 | [NZ] | New Zealand | 245958 |
| Mar. 26, 1993 | [NZ] | New Zealand | 247268 |

[51] Int. Cl.$^6$ ................................. H02J 3/06
[52] U.S. Cl. ................ 307/85; 191/10; 191/6; 191/12 R; 104/287; 104/288; 104/292; 104/298
[58] Field of Search .................. 307/85; 191/10, 191/6, 12 R; 104/23, 288, 298, 287, 292

[56] References Cited

U.S. PATENT DOCUMENTS

| 3,792,665 | 2/1974 | Nelson | 104/148 |
| 5,207,304 | 5/1993 | Lechner et al. | 191/10 |
| 5,293,308 | 3/1994 | Boys et al. | 363/37 |

Primary Examiner—William M. Shoop, Jr.
Assistant Examiner—Albert W. Paladini
Attorney, Agent, or Firm—Young & Thompson

[57] ABSTRACT

A primary inductive track or path 450 for a resonant inductive power distribution system is made up from a number of modules 453, each supplied as a pre-built and substantially pre-tuned segment of the track. These modules have more than one capacitor 456, 457 and more than one inductance 458, 459 (generally, the inductance is the intrinsic inductance of the length of track) and each capacitor and adjacent inductor is capable of resonating at its own native frequency. A zero-inductance cable 452, carrying a small fraction of the circulating resonant current (comprising a mis-match or an error current), directly connects the capacitors at poles having equal polarity and tends to constrain the system limiting possible frequencies of resonance.

13 Claims, 8 Drawing Sheets

PRIMARY INDUCTIVE PATHWAY

BACKGROUND OF THE INVENTION

1. Field of the Invention

This invention relates to power distribution systems, particularly those using inductive power transfer from high frequency resonant currents within the primary conductors, and more particularly to modular resonant magnetic field emitter units.

2. Description of the Related Art

Long-standing problems exist in the conventional transfer of electric power to self-powered moving vehicles. Those having a sliding brush rubbing along a fixed current-carrying conductive rail exhibit wear, dust production, intermittent loss of electrical contact, sparking, and electric shock hazards. Vehicles lacking the guidance of weight-bearing rails are particularly prone to wander away from a defined route and are then likely to lose electrical contact with a supply conductor.

Inductive power distribution systems overcome many of the problems by using the alternating magnetic field surrounding a fixed primary conductor to induce current in a secondary conductor at some distance from the primary conductor, thereby avoiding direct contact. They are particularly suited to providing motive power.

The use of high-frequency resonating currents within primary and secondary conductors has greatly improved the efficiency of inductive power distribution, and recent developments in semiconductor technology have permitted the application of improved inductive power systems as have been described by Boys & Green in WO 92/17929.

Resonant inductive power transfer systems been hampered by the difficulty of driving long tracks with sufficient power. Although a track of a given length can be supplied with more power simply by using higher voltages, reasonable safety requirements may be exceeded, and the ratings of presently available electronic components used in the power supply will generally be exceeded with output voltages above 600 V.

A further drawback of such systems is the risks to health understood to be caused by strong magnetic fields radiated by current-carrying conductors; risks that have resulted in stringent field strength guidelines being adopted. Delivery of realistic amounts of energy for motive power purposes is usually likely to breach these restrictions.

OBJECT OF THE PRESENT INVENTION

It is an object of the present invention to go some way towards providing an improved and safer inductive power transportation system, or at least to provide the public with a useful choice.

SUMMARY OF THE INVENTION

In one aspect the invention provides a primary inductive pathway for a resonant inductive power distribution system capable of operating at a system resonant frequency, said pathway adapted to be connected to a power supply and having two spaced apart conductors terminated by a bridging element and forming with said power supply a closed loop,
wherein said primary inductive pathway comprises at least two primary conductor modules, each primary conductor module having a resonant frequency compatible with the system resonant frequency, each said primary conductor module comprising a first conductor and a second conductor spaced apart from one another, each conductor having a first connector and a second connector, each module having at least one capacitor;
each module being capable of connection to adjoining conductors within adjacent modules or to a bridging element at one end of the pathway,
so that a number of modules can be joined together to form a longer pathway, through the length of which an effective amount of inductive power can during use be propagated.

In another aspect the invention provides a primary inductive pathway for a resonant inductive power distribution system capable of operating at a system resonant frequency, said pathway adapted to be connected to a power supply and having a first conductor and a second conductor spaced apart from one another
wherein the first and second ends of each conductor are brought close together, and the pathway includes a capacitor, and a linkage;
each conductor having a first end and a second end, a connector at a first end capable of being connected to a power supply, the capacitor being connected across the second ends of the first and second conductor,
the linkage comprising a connection between the first end of the first conductor and the second end of the second conductor, and a connection between the first end of the second conductor and the second end of the first conductor,
whereby in use an effective amount of inductive power can be propagated along the length of the pathway.

Other aspects of the invention are set out in more detail in the claims.

BRIEF DESCRIPTION OF THE DRAWINGS

The following is a description of preferred forms of the invention, given by way of example only, with reference to the accompanying diagrams.

DESCRIPTION OF THE PREFERRED EMBODIMENTS

The inductive-power installations on which these embodiments are based comprise at least one primary conductor, but preferably a loop of two parallel conductors laid along a defined route. The primary conductors, which carry a substantial alternating current at a high frequency are preferably made of litz wire having a total surface area capable of handling the current levels involved.

The preferred operating frequency is generally in the region of from 10 to 50 KHz, particularly reflecting limitations of the solid-state switches available—and also limitations imposed by conductor losses and radiated power, though the principles may be applicable to a much wider range of frequencies, such as from 50 Hz to 1 MHz. With higher frequencies the amount of ferromagnetic core material required in some cases becomes much smaller. Preferred embodiments have been built with operating frequencies of the order of 10 KHz and available power levels of 150 W and 500 W, the latter supplied at 600 V and capable of energising a 200 meter length of track. Typical power supply output for large yet practical supplies is of the order of 600 V AC, and typical circulating resonant currents are of the order of 70 A.

Preferably the primary circuit is a resonant circuit, so that the circulating current tends to approximate a sine wave and is then substantially free of harmonics (thus minimising electromagnetic radiation and losses). The power supply needs only to maintain a circulating current but not generate or switch the total current. Inductive electric power transfer from the primary conductor(s) reaches across a void and enters into one or more secondary pickup coils, optionally with the aid of flux concentrating materials, and subsequent electric power utilization is generally but not always direct; without storage. Generally the secondary or pickup conductors will comprise resonant circuits as well.

A prior-art installation (FIG. 1) may comprise at least one preferably resonant primary circuit 102. In most cases the primary conductors run uninterruptedly along the designated path or track 108 taken by vehicles 107, although intermittent availability of inductive power (e.g. at declared bus stops) and intermediate energy storage within the vehicle is an alternative. A switching power supply 103 at the left of FIG. 1 comprises an inductor 105 effectively providing a constant current from a voltage source, a split inductor 104 to feed power to either solid-state switch 106, (inductors 105 and 104 both having a high reactance at the operating frequency), a resonant circuit comprising the inductor and primary conductor 102 and the resonating capacitor 101. Usually, the switches are driven in a complementary mode by a zero-crossing sensor so that their action will reinforce the oscillating current detected within the resonant primary conductor 102. Note that the primary circulating current does not pass through the switches—only the "topping-up" current does. Control and protection means is not shown here, but generally operates by varying or interrupting the input voltage.

Figure 4A:
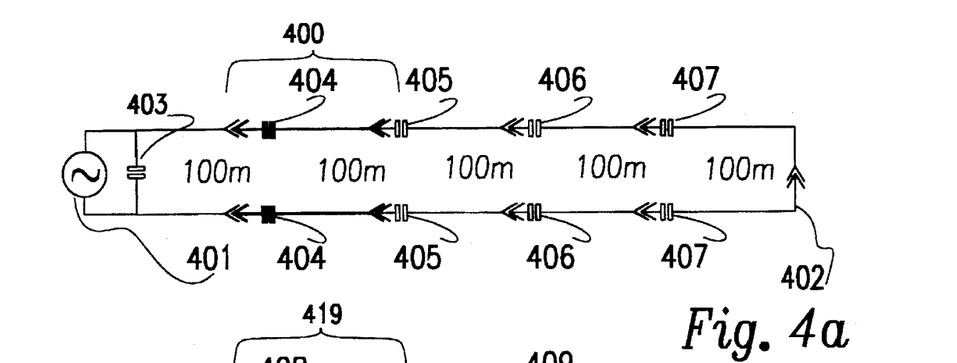
FIG. 4a is a circuit diagram illustrating a series of modules each comprising two discrete capacitances with distributed inductance within unit lengths of track conductors, to lengthen a track.
Figure 4B:
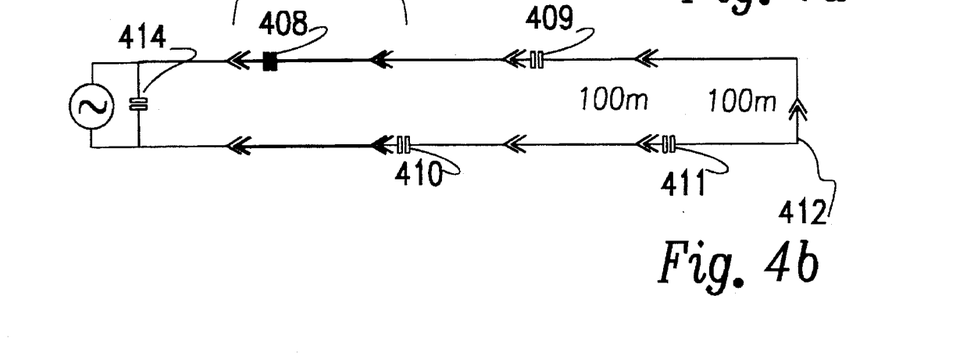
FIG. 4b is a circuit diagram illustrating a series of modules each comprising one, alternated, discrete capacitance together with distributed straight-wire inductance within unit lengths of track conductors, to lengthen a track.
Figure 4C:
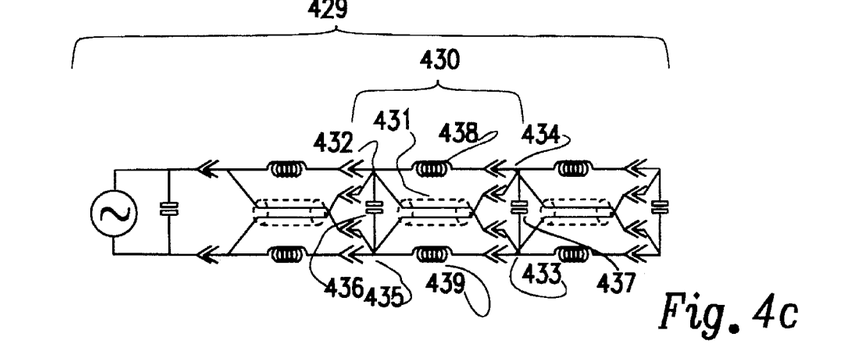
FIG. 4c is a circuit diagram illustrating a series of modules each comprising two discrete capacitances with distributed inductance within unit lengths of track conductors, and individual lengths of zero-inductance cable, used to lengthen a track while restricting possible modes of oscillation.
Figure 4D:
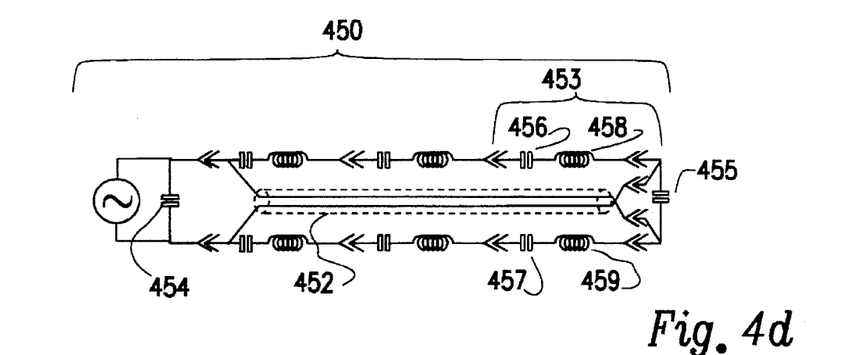
FIG. 4d is a circuit diagram illustrating a series of modules each comprising two discrete capacitances with distributed inductance within unit lengths of track conductors, and a single length of zero-inductance cable, used to lengthen a track while restricting possible modes of oscillation.
Figure 4E:
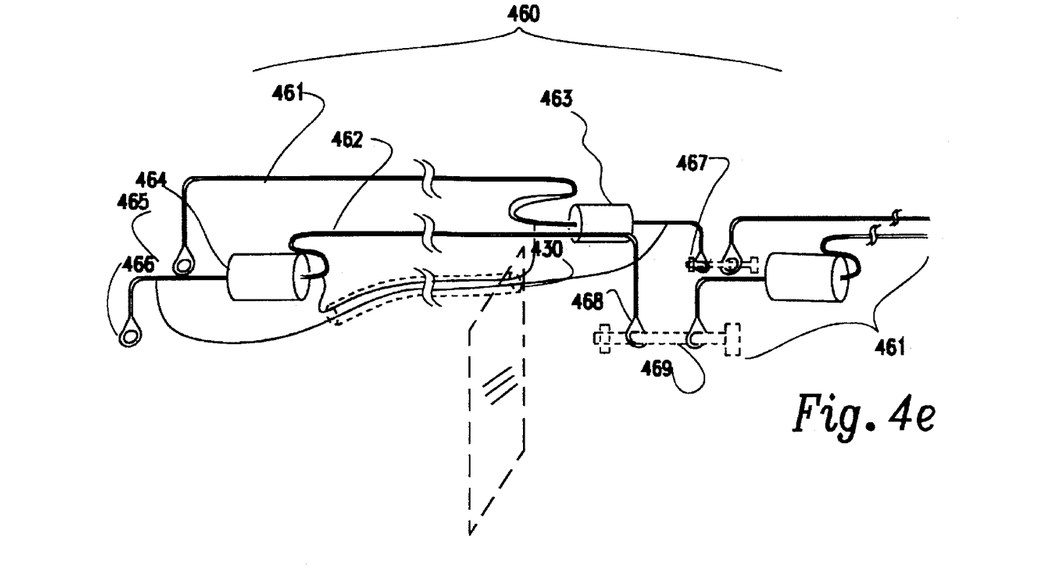
FIG. 4e illustrates the electrical components comprising a single module and including a zero-inductance cable as for FIG. 3e.
Figure 4F:
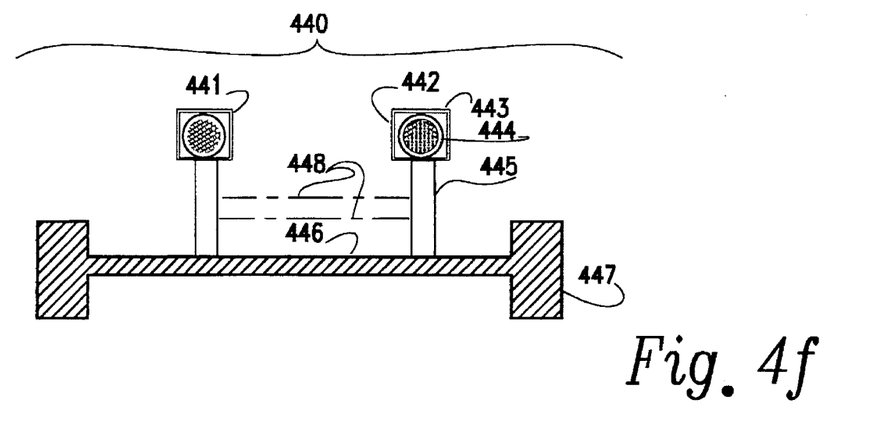
FIG. 4f illustrates a section through the primary conductors and the substrate (conveyer style)
Figure 4G:
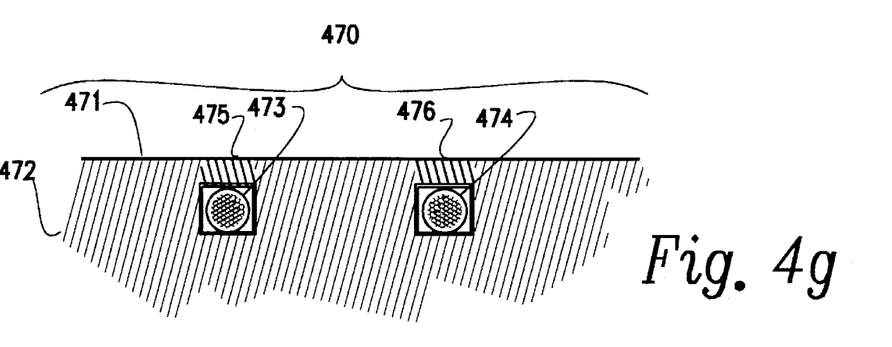
FIG. 4g illustrates a section through the primary conductors embedded in a substrate such as a floor.
Figure 9:
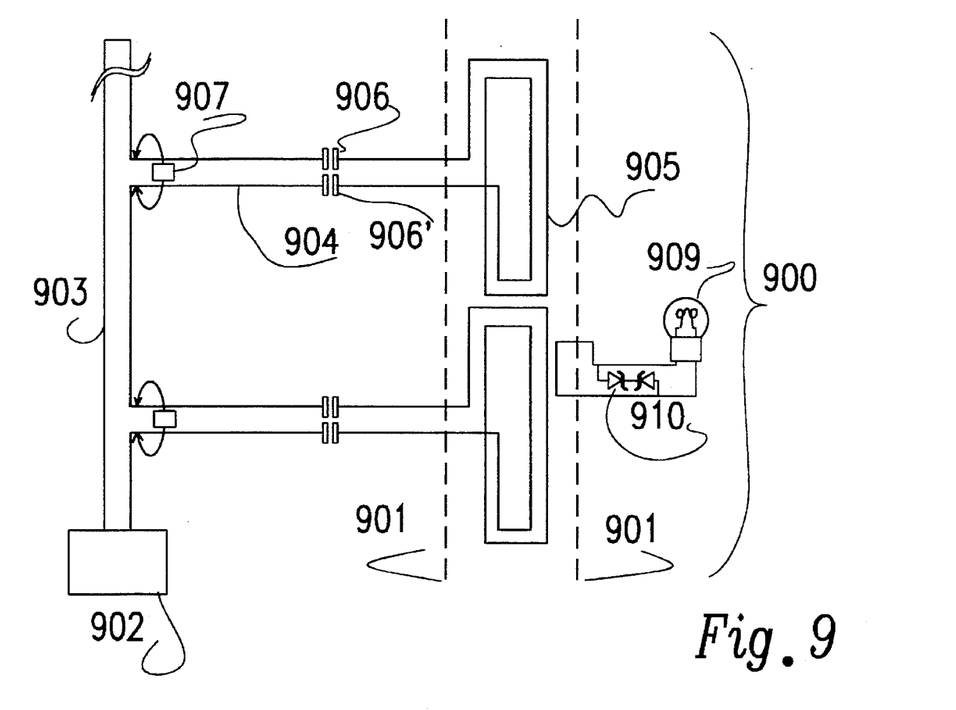
FIG. 9 is an illustration of one method (shorting switches) for providing power to selected segments of an automatically-guided vehicle track.
Figure 10:
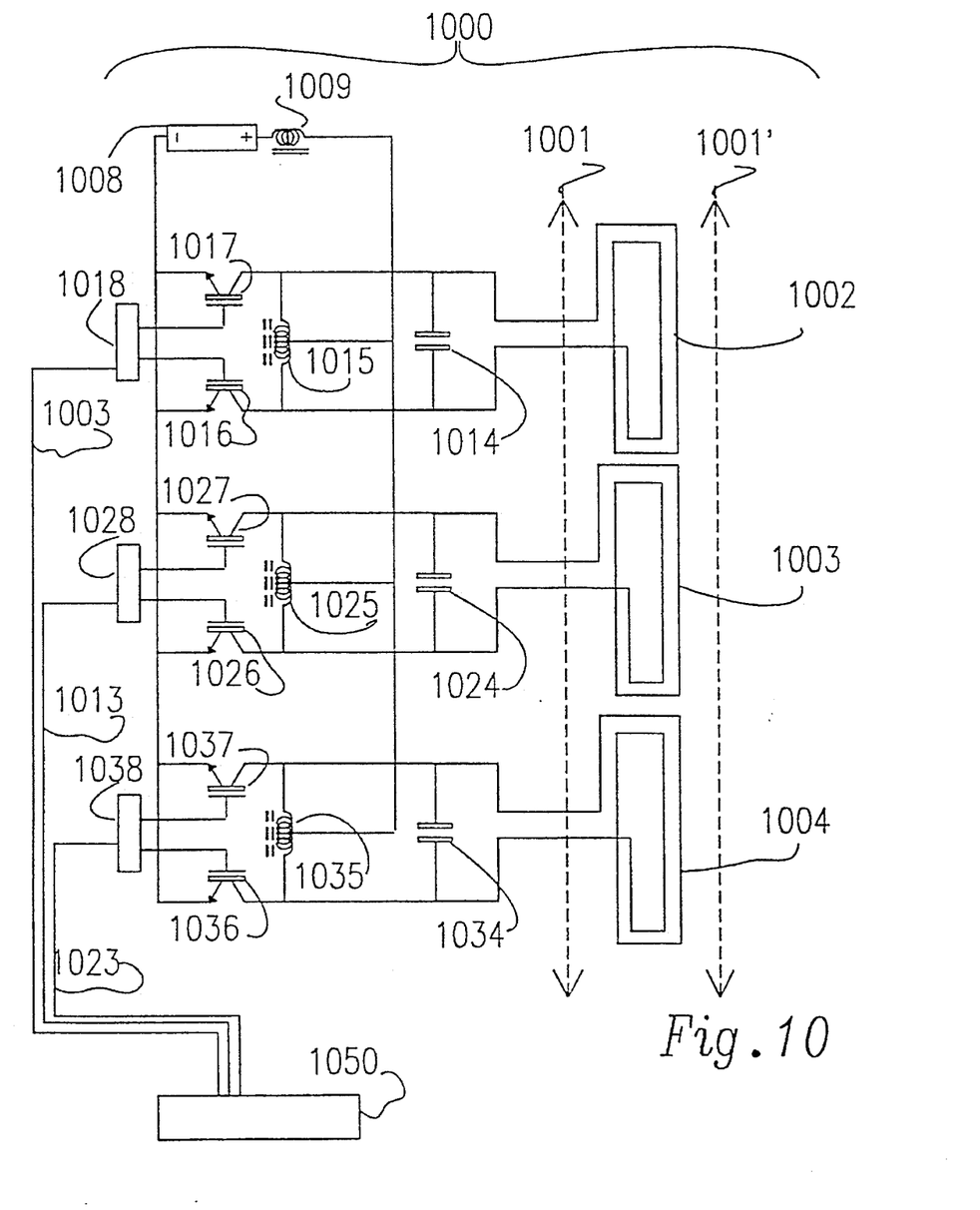
FIG. 10 is an illustration of another method (multiple power supplies) for providing power to selected segments of an automatically-guided vehicle track.

The track may be comprised of an exposed structure such as a railway track, conveyer track or monorail (FIG. 4f or FIG. 7), or it may be an invisible path delineated by the field emanating from one or more conductors concealed within a roadway or floor (FIGS. 4g, 9, and 10).

Even larger installations may be constructed by scaling up the power-handling electronics, and the number of vehicles or the motor, and motor drive circuitry on each, without departing from the novel concepts described here. Given a real voltage limit, long tracks may preferably be divided into sections; each fed from one of a number of separate power supplies. Some options for this are illustrated in FIGS. 9 and 10.

Figure 1:
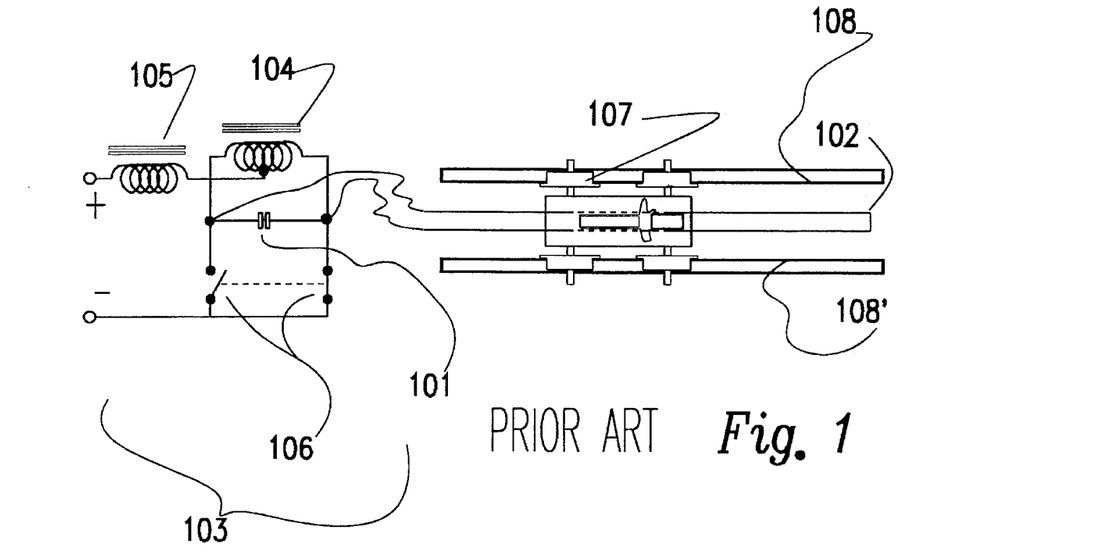
FIG. 1 is an illustration showing a prior-art conductor for an energised track.
Figure 11:
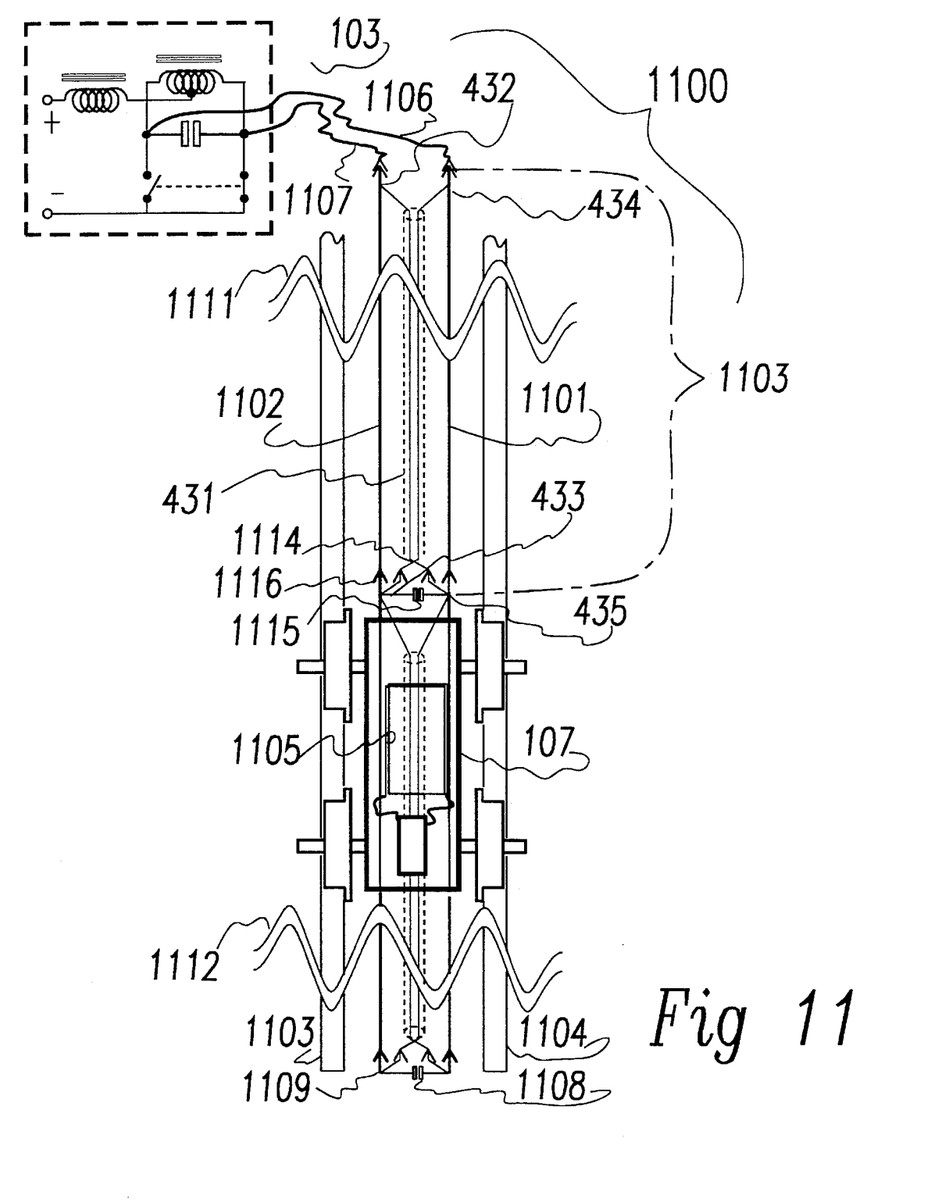
FIG. 11 is a plan view of an illustration illustrating the circuit of FIG. 4c with a trolley and power supply.

FIG. 11 is based on FIGS. 1 and 4c. FIG. 11 shows a plan diagram of an example installation 1100 for powering (from a prior-art high-frequency power supply 103) a track comprised of rails 1103, 1104 plus electrical components of this invention. A moving trolley 107 running on wheels along the track is powered from an onboard pickup coil 1105 by means of inductive coupling across a space from a primary inductive pathway including a pair of primary inductive conductors 1101, 1102 which run (from module to module) along the length of the track.

This particular example (selected from a number of disclosed possibilities) is taken from the track drawing of FIG. 4c. The conceptual lumped inductances (representing track inductance) such as 438, 439 of that drawing have been removed because this diagram represents an actual track. The portions removed at the wavy lines 1110, 1111 would be much longer than the depicted track had they been included in the drawing at this scale. The primary inductive conductors are connected at one end of this energised section of the track to the resonant power supply 103 by leads 1106 and 1107. (Of course, a very long track may include several power supply units, one for each unit of energised track). The two primary inductive conductors are terminated at the far end of this energised section of the track by a capacitor 1108 which is preferably provided as part of a module 1109 in order to facilitate installation and maintenance. In fact the entire electrical portion of the track is preferably provided as a series of modules. One module is shown at 1103. It includes:

part of the pair of primary conductors 1101, 1102 a length of "zero-inductance" cable 431 containing two conductors carrying currents which in balanced use are in a parallel direction but in reverse (note the crossover at 1114)

a capacitor 1115, preferably standardised connectors 1116 in order to facilitate installation and maintenance and mounting means for tracks and conductors.

Normally each module is of a standard length and the capacitor size is pre-tuned during module manufacture having reference to a preset operation frequency and track inductance. The physical placement of the zero-inductance cable is not important but it is preferably spaced apart from the field generated by the resonant currents flowing in the movable pickup coil. The zero-inductance cable joins nodes 432 with 433 (both being of substantially the same phase and amplitude) and the complementary pair of nodes 434 with 435, and one of its effects is to keep all portions of the primary conductor in synchrony with each other; minimising tendencies for "autonomous resonances".

PREFERRED EMBODIMENT 1

Lengthening the Drivable Track

Current practice in the field of resonant inductively powered loops to which these improvements are addressed generally consists of providing resonant power supplies in conjunction with single conducting loops. Typical Q values under load are about 2 or 3. Preferably a module of track (as detailed later) is about 10 to 100 meters long. Typically, module capacitors are about 1.6 microfarads, and typical inductances are about 3 microhenries per meter of track.

The distributed self-inductance of this loop is commonly used as the inductance of the resonant circuit energised by the resonant power supply placed at one end of the loop. It has been found difficult to force sufficient power into overly long purely inductive primary loops, given that present semiconductor ratings—and safety considerations—limit the voltage available to about 600 V.

This preferred embodiment makes use of transmission line theory and in particular uses pi-coupling principles. This embodiment allows increases of the line length at the cost of a relatively small investment in capacitors.

An explanation of this principle (as shown in the Figures) is as follows.

FIG. 4a illustrates the general concept of a series of modules each having at least one discrete capacitance with distributed inductance within unit lengths of track conductors, with each module connected to an adjacent module or a bridging element.

Each module (e.g. 400 in FIG. 4a or 419 in FIG. 4b) comprises a mounting system for, and a pair of conductors which are capable of radiating a magnetic field and hence have an intrinsic inductance. Each conductor has a series capacitor—404, 404, 405, 405, or 406, 406 etc—placed at some standard position along the conductor for the sake of modularity. Terminations are provided for electrical connection with adjoining modules.

This process of adding a module having a capacitor in series with each free end may be repeated a number of times, as shown in FIG. 4a, (where supply 401 feeds power across a resonating capacitor 403 and then down an extended line 402 inserted in which are pairs of series capacitors 404, 405, 406, and 407), until such time as other losses (radiative, eddy-currents in adjacent structures etc, or normal use) diminish the power available below a usable level.

Figure 2:
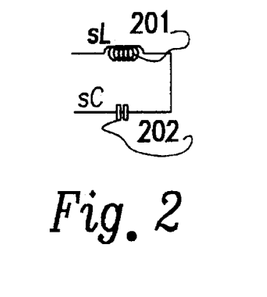
FIG. 2 is a circuit diagram of a lumped-component equivalent to a shorted track ending.

FIG. 1 shows the prior-art track circuit condition. The final track circuit as in FIG. 4a, is developed as follows from the simple closed loop shown in FIG. 1. The simple closed loop of FIG. 1, inherently having distributed inductance associated with its straight wire conductors, is functionally equivalent to the series resonant circuit as shown in FIG. 2, (a discrete inductance 201 in series with a capacitance 202), resonating at the operating frequency. Given that it is already common practice in such installations to use the distributed inductance of the conductors as the resonant inductance, it is then possible in principle to replace the short-circuit at the end of the loop with a series capacitance 313 and the inductance 312 of a further length of line (again, short-circuited at its far end) as shown in FIG. 3b.

Figure 3A:
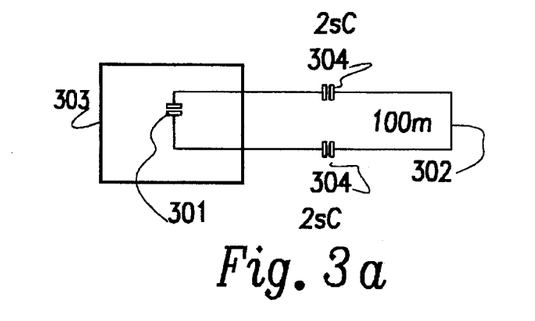
FIG. 3a is a circuit diagram comparable to FIG. 2; realised with track components ( for a distributed inductance) and discrete capacitances.
Figure 3B:
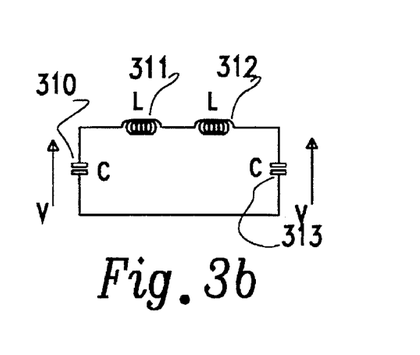
FIGS. 3b and 3c describe methods for capacitor voltage rating reduction.
Figure 3C:
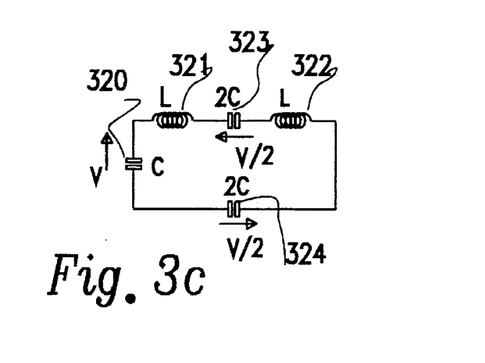

Preferably the series capacitance is placed as shown in FIG. 3c in series with both sides of the conductor loop as separate units 323, 324 each of capacitance 2C in order to maintain symmetry, and also to halve the working voltage requirement of the capacitors. Preferably the added capacitance and inductance are chosen to be together resonant at the system operating frequency. This condition is illustrated in FIG. 3a, where the box 303 represents a power supply for switching current alternately into either end of 301, the resonant capacitor. At approximately the position where the track would have been terminated by a short circuit, a pair of resonating capacitors 304 of value 2C have been inserted, followed by a second, substantially equal length of track 302.

FIGS. 3b and 3c illustrate a preferred method for achieving a lower voltage across the series capacitances. In FIG. 3b, the resonant capacitor within the primary supply is 310; the voltage across it drives the track (in part indicated by the inductances 311 and 312) and substantially the same drive voltage is found across the far capacitor 313. If two series capacitors (323 and 324) are used as indicated in FIG. 3c, only half the initial drive voltage is placed across each one. FIG. 3c is analogous to FIG. 3a, except that the distributed track inductance is explicitly drawn as the inductors 321, 322 each of value L.

It will be clear that this process of adding an open loop of conductor having a capacitor in series with each free end may be repeated a number of times, as shown in FIG. 4a, (where supply 401 feeds power across a resonating capacitor 403 and then down an extended line 402 inserted in which are pairs of series capacitors 404, 405, 406, and 407), until such time as other losses (radiative, eddy-currents in adjacent structures etc, or normal use) diminish the power available below a usable level.

The use of added lengths of relatively long track each having a substantially fixed intrinsic inductance, capacitance, and hence a substantially preset resonant frequency is convenient from a manufacturing point of view because track may be supplied in pre-tuned modules for installation at any site. Each module (e.g. 460 in FIG. 4e) comprises a mounting system and a pair of conductors 461, 462 which are capable of radiating a magnetic field. Each conductor has a series capacitor—463 with 461, or 464 with 462—placed at some standard position along the conductor for the sake of modularity. Terminations 465, 466, 467, 468 are provided for electrical connection with adjoining modules (e.g. 461). The connectors shown here are simple terminating lugs preferably of aluminium for bolting together (bolt; 429) though other suitable types of connector may be used.

The substrate that would usually be provided as an assembly together with the electrical components of each module is shown in FIG. 4f as 445—a standoff, supporting 442, a conductor/sheath assembly comprising insulating container 443 about a sheathed litz wire 444. A spacing web (448) may be supplied as a disposable part of each module to maintain optimal separation between conductor 442 and conductor 441. The support beam 446, 447 may or may not be supplied as part of a module, and the spacing web may be discarded after installation.

In the case of the floor version of the module for guiding and powering automatically guided vehicles, for instance, as shown in section 470 in FIG. 4g, a similar spacing web to 448 may be used to determine conductor (473, 474) spacing and parallel placement (as when modules are buried in concrete 472, when the spacing web may be buried with it) or shallow trenches may be cut in parallel using a diamond saw or an equivalent in existing floors and later filled in above the conductors with filler (475, 476).

Some methods for energising modules may allow the use of several turns of cable in a self-contained loop, as shown in FIGS. 9 and 10, and hence a section of floor as FIG. 4g would then show several turns of cable.

Figure 5:
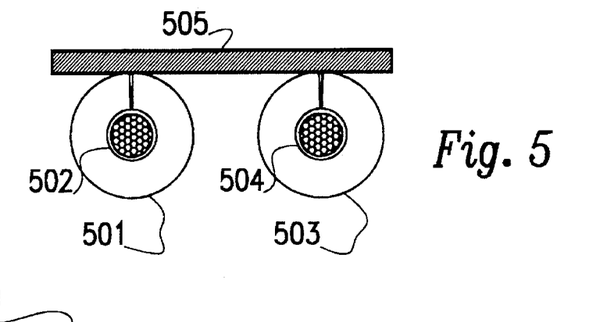
FIG. 5 is a section through a pair of toroidal cores surrounding a pair of conductors, used to compensate the resonant frequency of non-standard lengths of track by simulating non-existent lengths.

Ideally the example modules of FIG. 4a–4e are to be supplied as factory-assembled modules having a closely similar resonant frequency ready for installation. In the likely event of a short length terminating a track, the rise in resonant frequency may be compensated for using slitted ferrite toroidal sheaths 510, 503 placed around the primary conductors 502, 504 as shown in FIG. 5; each toroid of the preferred size being equivalent in inductance to a meter of track. Each toroid (501, 503) is slitted to provide an airgap and reduce saturation. A mounting plate is shown as 505. Alternatively, and especially if the capacitance is already comprised of a number of individual unit capacitors in series or in parallel, the number of capacitors used at any point in the circuit may be altered in order to maintain matching.

PREFERRED EMBODIMENT 2

Minimising Aberrant Resonant Mode Losses

This embodiment assumes the existence of a substantially electrically symmetrical pair of primary conductors, although its purpose is to correct for minor degrees of static or dynamic asymmetry.

One problem with systems such as that of FIG. 3c, or the individual modules of track as shown in FIG. 4a as 400, is that the presence of more than one inductor and more than one capacitor within a loop can allow the system to have more than one functional state, or more than one preferred frequency of resonance, which tends to cause instability. Such a system often resonates at an undesired frequency incompatible with the intended resonant frequencies of secondary coils or other modules.

Figure 3D:
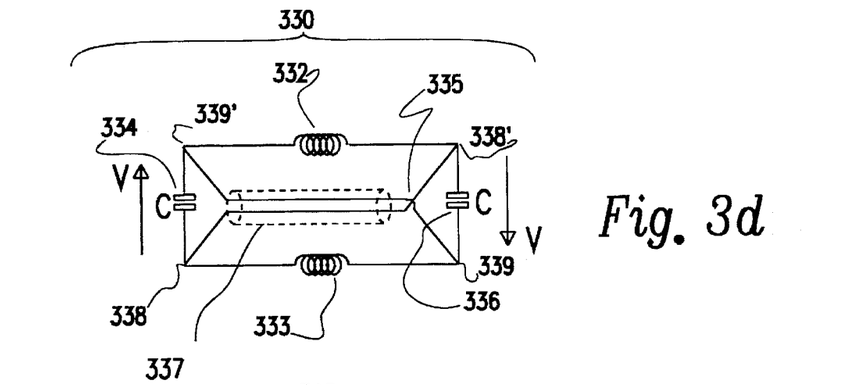
FIG. 3d is a circuit diagram of a closed resonant circuit of two inductors and two capacitors, having a zero-inductance cable joining nodes of the same phase and amplitude.

Surprisingly, it has been found that a "zero-inductance" cable comprising a pair of conductors fed in opposing directions can be run beside the primary conductors over long distances, joining points of equal or similar phase and magnitude polarity by the discrete capacitors, effectively placing them in parallel and thereby restricting the possible modes of oscillation or resonance. This arrangement 330 is shown in FIG. 3d, where the outer rectangle, containing alternate capacitors 334, 336 and inductors 332, 333, corresponds to the circuit of FIG. 3c.

A zero-inductance cable may be defined as a cable of indefinite length comprising a preferably symmetrical pair of conductors, one of which carries current of substantially equal magnitude but opposite phase to the current in the other conductor, with the pair of conductors sharing as far as possible a common magnetic field space so that the field developed by one conductor tends to cancel out the field developed by the other conductor. Practical forms of cable include:

Lengths of litz wire in which approximately half the conductors are dedicated to connecting one or the other pair of points, Multi-conductor insulated cables of the type used for telephone trunk cabling, which have the advantage of being colour-coded into two well-mixed but recognisable groups, or Paired insulated conductor cables of the types used as domestic power or lighting flex, such as "Trurip". Alternatively, coaxial cables wherein an outer sheath carries one sense of current while the inner conductor carries current in the other sense may be used, although these are not symmetrical cables.

In addition a length of zero-inductance cable 347 is provided. One conductor joins point 339 to point 339'; the other joins 338 to 338'. As these pairs of points are of similar polarity and magnitude, a small current only passes through the zero-inductance cable. (Its magnitude is a function of the closeness of the matching of the components in the loop, like an error current. It also reflects asymmetry of the inductive loading on the primary conductors.)

Preferably pairs of capacitors will be selected for closeness of matching at the time of assembly of modules, so that the current flowing in the zero-inductance cable is minimised, for it comprises a non-usable drain on the available resonant current for inductive power transfer.

Figure 3E:
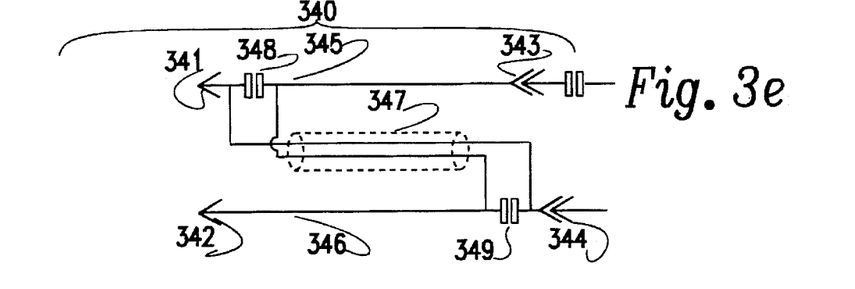
FIG. 3e is a circuit diagram of a resonant circuit of two inductors and two capacitors, having a zero-inductance cable joining nodes of the same phase and amplitude, and adapted to form a series-connected module of a resonant primary pathway.

As the circuit of FIG. 3c is a closed loop, the circuit of this invention has to be slightly modified for use in modules (e.g. 400) comprising parts of an elongated primary pathway, such as that shown in FIG. 4a. A preferred modification is illustrated as a circuit diagram in FIG. 3e, where the module 340 comprises two sets of the basic length of conductor 345, 347 (having inductance) plus a discrete capacitor 348, 349 together with interconnections through the zero-inductance cable 347. Connectors 341, 342, 343, and 344 are for electrical connection to adjacent modules.

The use of added lengths of relatively long track each having a substantially fixed intrinsic inductance, capacitance, and hence a substantially preset resonant frequency is convenient from a manufacturing point of view because track may be supplied in pre-tuned modules for installation at any site. Consider an installation comprising a series of modules driven from one end by a generator of resonating current 401. Each module (e.g. 400 in FIG. 4a or 419 in FIG. 4b) comprises a mounting system for, and a pair of conductors which are capable of radiating a magnetic field and hence have an intrinsic inductance. Each conductor has a series capacitor—404, 404, 405, 405, or 406, 406 etc— placed at some standard position along the conductor for the sake of modularity. Terminations are provided for electrical connection with adjoining modules.

FIG. 4b simply shows a variant of the above in which each module 419 comprises one capacitor-less conductor and symmetry is to be maintained by alternating the capacitor-containing conductors to lie in one line or the other.

FIG. 4c incorporates the zero-inductance cable 431 within one module 430 of a series forming a primary resonant circuit 429. In FIG. 4c, one conductor of the cable 431 joins the node 432 with the node 433 of substantially the same phase and amplitude, while the equal-but-opposite current in the other conductor of the cable is derived from making a connection between nodes 434 and 435. Because the added cable 431 functionally approximates a zero inductance, the capacitors 436 and 437 can be tied together by a cable having substantially the same length as the inductive cables 438 and 439 yet having a smaller inductance than 438 or 439.

FIG. 4d illustrates another preferred configuration for a primary inductive pathway 450, in which a single zero-inductance cable 452 joins between the primary resonant capacitor 454 and the far-end capacitor 455, skipping a number of series-capacitor modules like 453. Thus the capacitors at each end of the resonant pathway 450 are effectively one capacitor, in an electrical sense, and thus the system is constrained to a reduced number of possible resonant frequencies.

Figure 4H:
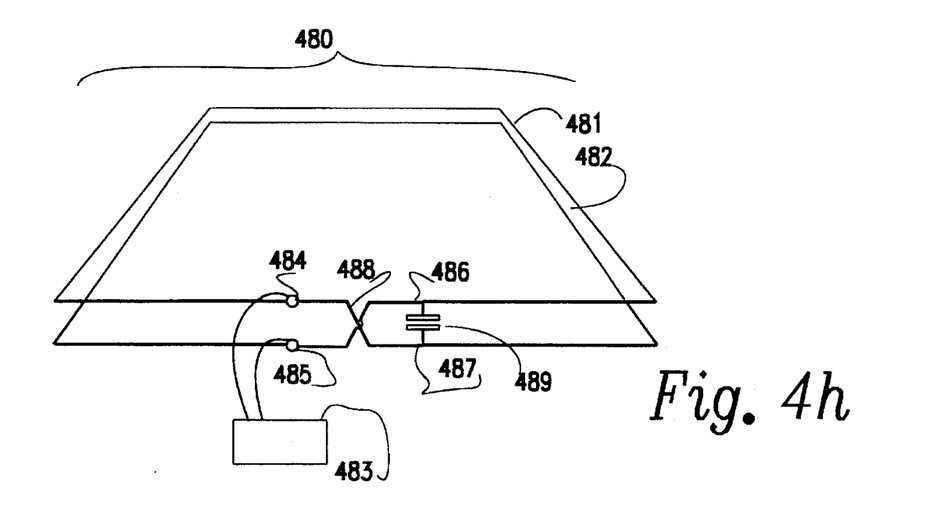
FIG. 4h illustrates the interconnection at the beginning and end of a looped primary conductor.

FIG. 4h illustrates the special case 480 wherein the track accompanying a primary conductor 481, 482 forms a closed loop. It illustrates a short length of zero-inductance cable 488—or even crossed-over connections—joining circuit nodes 486 and 487 across a terminating capacitor 489 and the point of switching supply introduction 485 and 483. It should be noted that switching power supplies 483 of this invention include a resonating capacitor—as shown for example in FIG. 10 as 1014 or 1024 or 1034.

PREFERRED EMBODIMENT 3

Minimising Induced-Field Losses

Figure 6A:
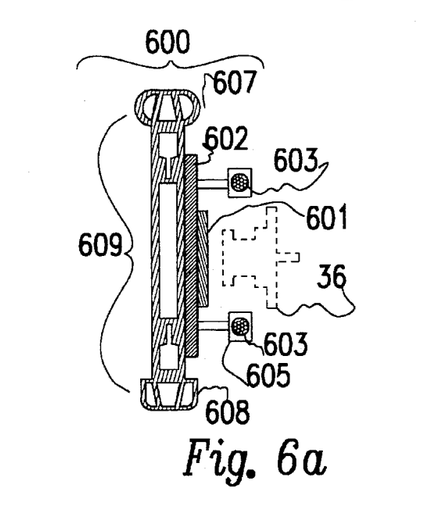
FIG. 6a illustrates a rail mounting cross section (6a), in which a conducting sheath serves to shield an underlying iron fishplate and minimise eddy currents within it.
Figure 6B:
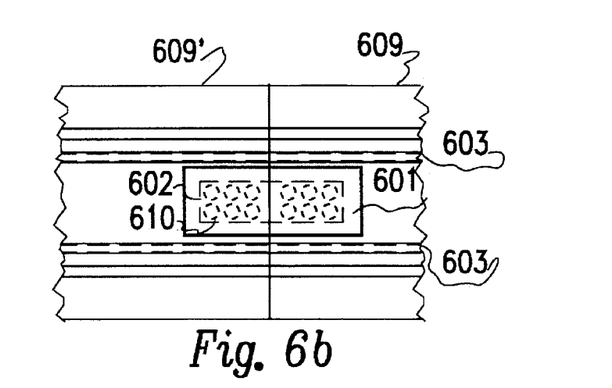
FIG. 6b illustrates the rail mounting of FIG. 6a in plan view.

Losses in adjacent ferromagnetic structures detract from the maximum path length, waste energy, and may induce hazardous currents or temperatures. FIG. 6a, 6b illustrate a rail mounting in plan view (6b) and cross section (6a). Conductors 603 are mounted on aluminium I-beams 609. The rail mounting 609 preferably comprises an extruded beam having a general I-section configuration with an enlarged head 607 and foot 608 section for structural strength. Abutting sections of the rail mounting beams 609 against 609' are joined by a steel fish plate 602 which is covered and protected from alternating magnetic fields by an aluminium plate 601, fastened with bolts 610. Some of the alternating magnetic field radiated by the primary conductors 603 running inside their insulating ducts 605 and supported by the I-beam of aluminium 607 comprising the conveyer rail 609 may be dissipated as eddy currents, and more particularly as hysteresis, in conductive ferromagnetic (i.e. iron or steel) items (e.g. fish plate 602) lying within the field. As ferromagnetic items tend to concentrate flux lines they enhance this effect.

It has been found that the application of a conductive cover or sheath 601, formed from (for example) 3 mm thick aluminium sheet—although copper or other conductors may be used—over such items has the effect of protecting ferromagnetic items from exposure to magnetic fields, and thereby reduces the dissipation of energy.

PREFERRED EMBODIMENT 4

Distributing Current Into Branches

Figure 7:
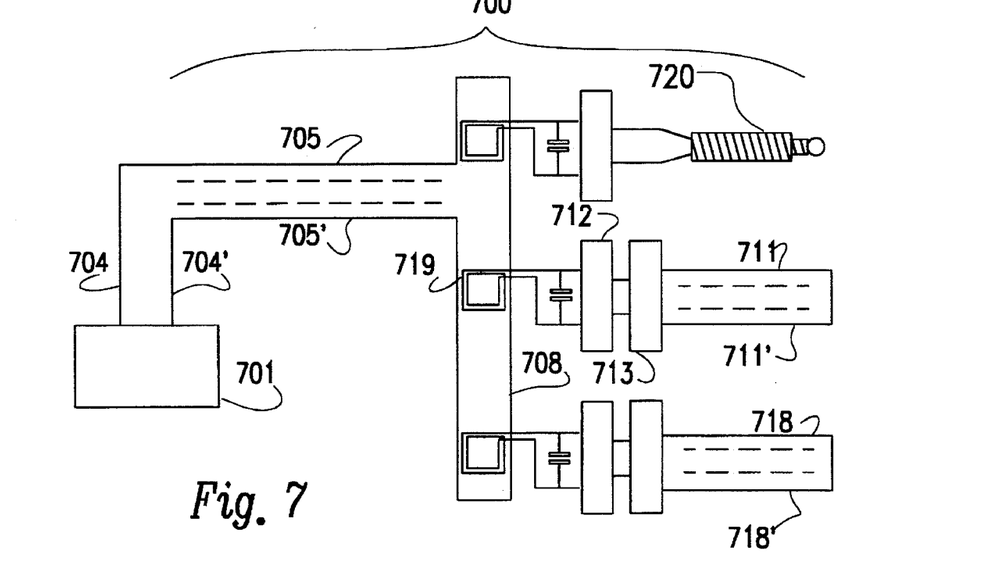
FIG. 7 illustrates a branching rail or conveyer network having a single power supply and means to carry and control energy from the first-energised primary to branch conductors or powered devices like lifts.

FIG. 7 illustrates a rail network 700 transferring high-frequency AC power from a trunk or busbar set of primary conductors 708 to other sets. This type of configuration is applicable to conveyer installations where devices such as switching points, lifts, etc require substantial amounts of energy and it is convenient to supply this energy from the resonant primary conductors.

Power from a principal power source 701 is directed along conducting wires (all preferably made of litz wire) 704, 704, mounted adjacent to weight-bearing rails 705, 705. Sets of rails 705, 705' are linked to other rails 715, 715' by a main electrical power supply bus or duct 708. This may in fact comprise a set of primary conductor modules (as 420 in FIG. 4b) with the additional purpose of radiating an alternating magnetic field. A power control or modulation box 712 is mounted adjacent to rails and energises the resonant conductor 711, 711. Control box 713 may similarly be provided between the main supply bus 708 and a conductor 718, 718'. Transformers 719 may also be used for power coupling—for isolation purposes (as magnetic breaks) or to step a voltage up or down.

PREFERRED EMBODIMENT 5

Ancillary Coils Beside the Primary Conductors

Figure 8:
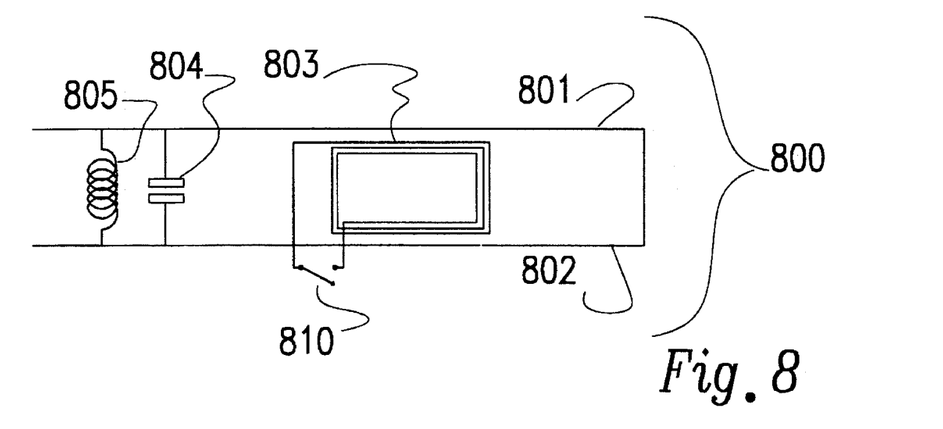
FIG. 8 a circuit diagram showing an induction line, and a signal coil positioned in close proximity to the track.

FIG. 8 illustrates an ancillary signal loop or coil module 803 associated with an induction line, having as its primary conductors a pair of litz wire cables 801 and 802, and a resonating capacitor 804, with the ancillary coil 803 magnetically coupled to the primary conductors. It will be appreciated that the induction line may also have other capacitors and/or inductors as described in earlier embodiments.

Ancillary coil module 803 can be used to detect the position of an object, especially one including a resonant secondary circuit, as it moves along the track. By measuring the voltage developed within the coil 803, it is possible to detect when a movable body powered via a secondary pick-up coil passes the ancillary coil. When such a vehicle overlies the coil, the voltage in the coil will increase. The coil 803 preferably has a switch 810, so that the ancillary coil can be switched between a closed circuit state and an open circuit state. The vehicle can be stopped at this point by closing the switch 810, to short circuit the coil, and thus withdraw power from the coil providing power to the vehicle. It is also possible to modulate closure of the switch 810, so that a generated signal can pass from the ancillary coil 803 now a signal coil—to the trolley. Only one such signal coil is shown in FIG. 8, but such coils can be provided at a number of pre-determined intervals or positions along the track.

PREFERRED EMBODIMENT 6

Disabling Unoccupied Segments

This embodiment (FIG. 9) and that of FIG. 10 are intended to minimise the amount of the alternating magnetic field radiated from the primary conductor into a general area. In these examples individual modules of the series making up the primary conductive path may be separately and specifically energised by a controller, when a nearby power consumer is active.

There are strict safety standards covering magnetic field radiation in many countries, which may easily be breached by an installation providing sufficient power to energise a vehicle having a useful capacity. The solutions of this invention apply particularly to automatically guided vehicles (AGVs) receiving their power from primary conductors concealed within the floor of a roadway or warehouse, and thus providing magnetic fields more liable to intersect human flesh than are fields from an overhead conveyer.

The safety standards would have equal importance for a roadway where inductive power transfer is used to power passenger vehicles and the like. Further advantages of minimising the radiated field include greater efficiency because a smaller area is filled with the alternating magnetic field than if an entire track was to be activated all the time.

The underlying principle of this solution is to divide the entire route or track into short modular segments, each being comparable to or not much greater than the length of a typical passenger vehicle or automatically guided vehicle (AGV), and energise each segment only when necessary. With any potential vehicle/person interaction there is a minimum safe approach distance as set by the risk of collision, particularly in the forward direction. A track segment may defined as the sum of a safety distance plus the vehicle length itself. The invention is nevertheless equally applicable if the segment distance is set without reference to the above length-determining factors.

As a further and independent safety provision, localised optical or auditory warnings (such as a melody, a horn, a buzzer, flashing lights, etc) indicating that the adjacent segment of the track has become energised may be used, so that any segment powering system is relatively fail-safe. One preferred method is simply to use some of the circulating energy to run a filament or fluorescent lamp 909—via a magnetic coupling. Over-voltage protection such as by varistors or zener diodes 910 is preferred, in order to trap energy transients. An arrangement of buried fluorescent lamps beneath a translucent or transparent cover, running among the length of the trackway and illuminated when the surrounding segments are energised is a graphical way of warning personnel of a radiating segment.

Surprisingly it is not impractical to switch a segment of a main resonant loop in or out of service by shorting it. Although the typical power in the resonant circuit is perhaps 50A to 70A @ 600 V, de-energised segments may be shorted out so that they are bypassed and the circulating power in a shorted segment dies away quickly.

A diagram of this preferred embodiment is shown as FIG. 9, where 900 indicates a section of an AGV route 901. A series of selectively energisable loops (only two are illustrated and one is indicated as 905) is laid along a track along which vehicles are to travel. These vehicles are energised by inductive means using power from a suitable power supply 902 fed along a trunk pair of conductors 903. At intervals, one conductor (or the other) is interrupted by a branch 904, which feeds the corresponding loop 905 via series capacitors, 906. A shorting switch 907 is placed at or near the junction of the branch with the trunk. This diagram does not show control means to cause operation of the shorting switch 907; examples of such means are (a) a demand signal from the AGV picked up by adjacent sensors, (b) changes in load in the loop 905 as detected by means of small test currents passed by the shorting switch 907. The diagram does not show means to detect the presence of an AGV and cause segment switching to occur; nor does it illustrate safety means to directly indicate energisation of a track segment; such means may include lamps driven by pickup of current from the loop, or horns, buzzers, or other audio warning devices.

It will be appreciated that a shorting switch approach is suitable for situations in which the branches are placed in series with the main conducting loop 903; in that a resonant current circulates in the entire loop and may be used for the simultaneous powering of more than one module or segment.

Under this system the resulting magnetic field may be reinforced by overlaying several turns of the cable, thus multiplying the alternating magnetic field generated while retaining a lower current in the distribution section of the primary conductor. The number of turns used can be varied from segment to segment according to the anticipated average loading on the passenger vehicle or AGV above each segment, so long as the total available power limitations are borne in mind.

Magnetic shielding or physical distancing of the distribution sections of the primary conductor from walkways helps to maintain low magnetic fields in any occupied spaces.

When a shorting switch is opened, a load peak transient may be expected to occur until resonating current has built up in the newly added branch. On closure, little effect may be observed in the main conductors, while the resonating current will die away in time. The capacitors 906, 906' provide for resonance within the shorted branch 905 alone. These transients may be seen at the power supply whenever segments are shorted or opened, especially under fault conditions, and suitable protection of the power supply is required.

Preferably the shorting switch is a device which switches on or off "softly" so that resonating currents either build up or decay more slowly. The shorting switch may be a bidirectional pair of IGBT devices, a "TRIAC" or some other suitable solid-state switch. The gradual build-up or decay of the resonant current is preferably caused by operating the switch in a mode whereby it is closed for a falling or rising proportion of complete cycles respectively, so that zero-crossing switching occurs (to minimise transients) and harmonic distortion is minimised.

A preferred operation mode which overcomes a likely transient protection problem and which also provides a soft start effect is to momentarily switch off the power supply feeding the entire track and attached segments a short time before changing segments, wait until the resonant current has died away, perform the segment switching operations, and then re-energise the main power supply. Typical time delays are of the order of a few milliseconds only.

PREFERRED EMBODIMENT 7

Separate Switching Power Supply For Each Segment

This is illustrated in FIG. 10. As for the previous embodiment, the entire route or track (1001, 1001') is conveniently divided into short segments; each similar in length to the length of a vehicle plus an optional safety distance. An example of segment length is 10 m, though any specific figure is of course an example. Here three (1001x, 1002x,

1003x) of an indefinitely large number of energisable segments are shown. Again, no relationship to vehicle length need be imposed.

Each segment is energised when usage is likely. Preferably a central controller 1050 detects (and may control) the motion of an AGV or other power consumer along the track and enables a corresponding one of the switching controllers 1018, 1028, or 1038 via a control line 1023 so that the resonant power supply powers the associated segment. Other segments remain unenergised, with both controller switches (such as 1016–1017) in an open state although resonating currents may be induced within the LC circuit by mutual coupling at adjacent coil ends, particularly in the presence of the vehicle. Warning systems with (for example) lamps like 909 may be provided, as described in the previous embodiment.

Alternatively a series of local controllers replacing controller 1050 may be used in conjunction with a single supply bus to locally detect a demand in a particular segment, close a switch connected to a bus, and energise the resonant circuit in response.

Each module, comprising a length of track, a resonant capacitor and a switching power supply is connected via a bus cable to a constant-current source (here depicted as a constant-voltage battery 1008 and a constant-current-providing inductance 1009 having relatively high reactance at the operating frequency). An un-illustrated option is to use a separate constant-current-providing inductance 1009 to each switching power supply, in order to run more than one switching power supply at one time from the DC power source.

Each power supply is capable of developing and maintaining a resonant high-frequency current within the corresponding segment of track. Preferably about five turns of a litz wire cable is laid as a coil, elongated along the course taken by the AGV or other vehicle. This might be buried as shown in FIG. 4d. In use, initiation of a resonant current will be aided by an existing resonating current induced either from an adjacent loop or from the secondary coil of the AGV. As for the previous embodiment, the rise and decay of resonating currents are of relatively long duration—several milliseconds.

Surprisingly, there are many advantages to providing a separate power supply for each module. Problems of providing adequate high-frequency resonating power along long lengths of track are minimised, thus reducing the output voltage requirements of any power supply. Problems relating to installation are minimised, since in most cases a series of pre-packaged and pre-aligned identical units may be installed. The use of several (e.g. 5) turns of conductor at each segment reduces the peak current requirements. The relatively expensive parts of the power system such as the inductor 1009 need not be replicated—and now have a lower current requirement. Costs are reduced by mass-production of identical units, by simplified installation, and as a result of replacing the segment switches. System reliability is raised owing to inherent redundancy—one large supply is replaced by a number of smaller, lower power supplies.

Finally, it will be appreciated that various alterations and modifications may be made to the foregoing without departing from the scope of this invention as set forth in the following claims.

We claim:

1. A primary inductive pathway for a resonant inductive power distribution system operating at a system resonant frequency, said pathway being connected to a power supply and having two spaced conductors terminated by a bridging element and forming with said power supply a closed loop, wherein said primary inductive pathway comprises at least two primary conductor modules, each primary conductor module having a resonant frequency compatible with the system resonant frequency, each said primary conductor module comprising a first conductor and a second conductor spaced apart from one another, each conductor having a first connector and a second connector, each module having at least one capacitor;

each module being capable of connection to adjoining conductors within adjacent modules or to a bridging element at one end of the pathway, so that a number of modules can be joined together to form a longer pathway, through the length of which an effective amount of inductive power can, during use, be propagated.

2. A primary inductive pathway for a resonant inductive power distribution system as claimed in claim 1, wherein said at least one capacitor is connected in series with each conductor of said modules.

3. A primary conductive pathway for a resonant inductive power distribution system as claimed in claim 1, wherein a first of said modules has one capacitor in series with the first conductor of the first module, and an adjacent complementary module connected to the first module has one capacitor in series with the second conductor of a second module.

4. A primary inductive pathway for a resonant inductive power distribution system as claimed in claim 2, wherein repeating pairs of said first and second modules are connected together.

5. A primary inductive pathway for a resonant inductive power distribution system as claimed in claim 1, wherein said pathway has at least two bypass joining points which, in use, have equal or similar phase and magnitude so that the tied-together points are held more closely to the same phase and magnitude.

6. A primary inductive pathway for a resonant inductive power distribution system as claimed in claim 5, wherein the bypass comprises a zero inductance cable.

7. A primary inductive pathway for a resonant inductive power distribution system as claimed in claim 5, wherein each module includes a capacitor across its first connectors and a zero inductance cable joining the first connector of the first conductor of a first module to the first connector of the second conductor of an adjacent module; and joining the first connector of the second conductor of said first module to the first connector of the first conductor of said adjacent module.

8. A primary inductive pathway for a resonant inductive power distribution system as claimed in claim 1, further comprising loop energizing means comprising controllable switching means connected between two electrical connections at an origin of the loop, for providing a bypass route for high-frequency resonant current applied to the two electrical connections.

9. A primary inductive pathway for a resonant inductive power distribution system as claimed in claim 1, wherein said first conductor and said second conductor of each of said at least two primary conductor modules are mounted, in a parallel, spaced-apart configuration and thereby form an open-ended, elongated loop having an electrical connection at each end of each conductor, so that a chain of adjoining modules may be joined together in series and energized as a whole by a resonant power supply.

10. A primary conductive pathway as claimed in claim 1, wherein each of said at least two primary conductor modules includes a branch line, each branch line being connected to a main trunk line, said pathway further comprising means for shorting and bypassing a selected branch line to de-energize a corresponding module.

11. A primary inductive pathway as claimed in claim 10, wherein each of said at least two primary conductor modules comprises associated warning means powered directly or indirectly from current flowing within each module in order to indicate when each module is energized.

12. A primary inductive pathway as claimed in claim 1, comprising ferro-magnetic elements close to said pathway, wherein said ferro-magnetic elements are shielded from the magnetic fields by a conductive sheath.

13. A primary inductive pathway for a resonant inductive power distribution system operating at a system resonant frequency, said pathway being adapted to be connected to a power supply and having a first conductor and a second conductor spaced apart from one another, wherein a first and second end of each conductor are brought close together, said pathway further including a capacitor, and a linkage; each conductor having a first end and a second end, a connector at a first end being connected to a power supply, the capacitor being connected across the second ends of the first and second conductor, the linkage comprising a connection between the first end of the first conductor and the second end of the second conductor, and a connection between the first end of the second conductor and the second end of the first conductor, whereby, in use, an effective amount of inductive power can be propagated along the length of the pathway.

* * * * *